United States Patent
Pajukoski et al.

(10) Patent No.: US 9,345,006 B2
(45) Date of Patent: May 17, 2016

(54) SPACE FREQUENCY BLOCK CODING FOR PUCCH

(75) Inventors: Kari Pekka Pajukoski, Oulu (FI); Kari Juhani Hooli, Oulu (FI); Esa Tapani Tiirola, Kempele (FI); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 518 days.

(21) Appl. No.: 13/695,867

(22) PCT Filed: May 3, 2010

(86) PCT No.: PCT/EP2010/055968
§ 371 (c)(1),
(2), (4) Date: Dec. 26, 2012

(87) PCT Pub. No.: WO2011/137923
PCT Pub. Date: Nov. 10, 2011

(65) Prior Publication Data
US 2013/0100903 A1    Apr. 25, 2013

(51) Int. Cl.
*H04W 72/04* (2009.01)
*H04L 1/06* (2006.01)
*H04L 5/00* (2006.01)

(52) U.S. Cl.
CPC ......... *H04W 72/0413* (2013.01); *H04L 1/0606* (2013.01); *H04L 5/0023* (2013.01)

(58) Field of Classification Search
None
See application file for complete search history.

(56) References Cited

U.S. PATENT DOCUMENTS

2009/0180572 A1* 7/2009 Bar-Ness et al. ............. 375/295
2011/0170489 A1* 7/2011 Han et al. .................... 370/328

FOREIGN PATENT DOCUMENTS

CN         101039136 A     9/2007
WO     WO-2009/108020 A2   9/2009
WO     WO 2010/121641 A1  10/2010

OTHER PUBLICATIONS

R1-06-1122, 3GPP TSG RAN WG1#45, Shanghai, China 8012 May 2006, "Performance evaluations of STBC/SFBC schemes in E-UTRA Uplink", Alcatel, 6 pgs.
R1-063178, 3GPP TSG RAN WG1 Meeting #47, Riga, Latvia, Nov. 6-10, 2006, "ST-SF Coding and Mapping Schemes of the SC-FDMA in E-UTRA Uplink", Alcatel, 6 pgs.
R1-092340, 3GPP TSG RAN WG1 Meeting #57bis, Los Angeles, USA, Jun. 29-Jul. 3, 2009, "LTE—A transmit diversity schemes for Pucch format 1/1a/1b", Sharp, 11 pgs.
3GPP TS 36.213 V8.8.0 (Sep. 2009), "$3^{rd}$ Generation Partnership Project; Technical Specification Group Radio Access network; Evolved Universal Terrestrial Radio Access (E-UTRA); Physical layer procedures (Release 8)", 77 pgs.
3GPP TSG-RAN WG1 #58bis R1-094223 Oct. 12-16, 2009 Miyazaki, Japan; Qualcomm Europe; Transmit Diversity for PUCCH Format 2/2a/2b.

* cited by examiner

*Primary Examiner* — Diane Lo
(74) *Attorney, Agent, or Firm* — Harrington & Smith

(57) ABSTRACT

Apparatus including at least one processor and at least one memory including computer program code the at least one memory and the computer program code configured to, with the at least one processor, cause the apparatus at least to perform: determining at least one control symbol and at least one channel from a channel set for an at least one control symbol representing the at least one control signal for at least one output port; and determining at least one further control symbol and at least one further channel from the channel set for the at least one further control symbol for at least one further output port, wherein the at least one further control symbol and the at least one further channel is dependent on the at least one control symbol and the at least one channel.

16 Claims, 2 Drawing Sheets

SPACE FREQUENCY BLOCK CODING FOR PUCCH

Embodiments of the present invention relate to a method and apparatus for uplink control channel allocation and, in particular but not exclusively, to apparatus and a method for uplink control channel allocation use in a multiple input multiple output wireless telecommunications network.

It has been proposed to improve the coverage and capacity of communication by use of spatial diversity or spatial multiplexing. By using spatial multiplexing, the data rate can be increased by transmitting independent information streams from different antennas but using the same channel as defined by frequency and time resource and possibly spreading code.

These systems may be referred to as multiple input multiple output (MIMO) systems. These systems require complex controllers to control both the transmission and receiving elements of the mobile station and the base station.

Multi-stream single user MIMO transmission has been proposed and forms part of WCDMA (wideband code division multiple access), 3GPP LTE (Third generation partnership project-long term evolution) and WiMax system standards. In single user multiple input multiple output (SU-MIMO), a MIMO receiver with multiple antennas and receiving circuitry receives the multiple streams, separates the multiple streams and determines the transmission symbols sent over each stream of the spatially multiplexed data streams originating from single user equipment.

In the 3GPP forum, LTE-Advanced has been proposed to be an evolution of LTE Rel'8 system to address the ITU-R (International Telecommunications Union Radio communication Sector) requirements for IMT (International Mobile Telecommunications)-Advanced.

With the LTE-Advanced system (LTE-A) and particularly LTE Rel'10 the allocation of physical uplink control channel (PUCCH) channels with multiple antenna ports is problematic.

Channel selection for PUCCH channels using a single antenna or antenna port has been defined in standards. For example PUCCH format 1b channel selection is used within time division duplexing (TDD) within the standard defined in Rel'8 (3GPP TS 36.213 V8.8.0). This approach is likely to be standardised for later standard releases such as Rel'10 frequency domain duplex (FDD) because the number of hybrid acknowledgement requests (HARQ) feedbacks are increased due to component carrier aggregation.

Currently for multi-antenna equipment an approach for PUCCH format 1/1a/1b known as spatial orthogonal resource transmit diversity (SORTD) has been proposed. In SORTD, separate PUCCH channels are reserved for two antenna ports. In other words for each antenna port at least one separate PUCCH channel is reserved. However this is problematic in that it requires high PUCCH resource consumption and produces significantly decreased multiplexing capacity (with an associated increase in overhead).

Open loop transmit diversity requires orthogonal resources for different transmit antennas otherwise the transmit antennas will interfere with each other. However even with a single antenna channel selection requires relatively high numbers of resources. For example currently agreed standards require two PUCCH channels in format 1b for carrying 3-bit information and four channels for carrying 4-bit information. Any system which used the SORTD process for multi-antenna PUCCH channel selection would further duplicate the number of required channels. For example in SORTD PUCCH channel selection and allocation, eight PUCCH format 1b channels would be required to be reserved in order to carry four bits of control information.

Although separated PUCCH channels could be allocated to both antennas of a user equipment this produces the disadvantage that the multiplexing capacity is halved when compared to a single antenna port case. Furthermore when a single antenna port mode is used separately the resultant system lacks the spatial transmit diversity produced by the use of the SORTD or similar spatial diversity methods.

It has been proposed to use a space-cyclic shift block coding (SCBC) approach such as described in the PCT application PCT/EP2009/054642. However in such proposals there are limitations. Firstly the number of channels used is two. This limits the applicability of using SCBC for multi-antenna PUCCH channel selection carrying more than 3-bits information. Straightforward use of SCBC with multi-antenna PUCCH channel selection carrying number of information bits not restricted to 3 would further duplicate the number of required channels as with SORTD. Furthermore the PUCCH channels must be allocated inside a single physical resource block. This causes significant resource allocation limitations especially with dynamic resource allocation. There is currently no proposed solution for overcoming these limitations.

There is provided according to a first aspect of the invention a method comprising: determining at least one control symbol and at least one channel from a channel set for the at least one control symbol representing the at least one control signal for at least one port; determining at least one further control symbol and at least one further channel from the channel set for the at least one further control symbol for at least one further port, wherein the at least one further control symbol and the at least one further channel is dependent on the at least one control symbol and the at least one channel.

The method may further comprise: transmitting the at least one control symbol over the at least one channel from a first antenna port; and transmitting the at least one further control symbol over the at least one further channel from a second antenna port.

The determining at least one further control symbol and at least one further channel may comprise: receiving an indicator of the at least one control symbol and the at least one channel; and mapping the indicator to determine the at least one further control symbol and at least one further channel for the at last one further control symbol.

Determining at least one further control symbol and at least one further channel may comprise: pairing the channel set into pairs of channels; and mapping may comprises determining a further control symbol for the first channel of a channel set pairing by complex conjugating the at least one control symbol for the indicator indicating that the at least one channel is the second channel of the channel set pair, and a further control symbol for the indicator indicating that the at least one channel is the second channel of the channel set pair is the product of −1 and a complex conjugation of the at least one control symbol for the first channel of the channel set pair.

The indicator may comprise a vector comprising a first number of elements, wherein the first number of elements may be the number of available channels, and wherein each element may represent an indication of the symbol selected to be output on the channel associated with the element.

The mapping the indicator may comprise the mathematical function: $Y(i)=(-1)^{i+1} \text{conj}[X(2\lfloor i/2 \rfloor+(i+1 \bmod 2))]$, where Y is an indicator for the at least one further control symbol and at least one further channel comprising a second vector comprising the first number of second vector elements, and wherein each of the second vector elements represents an indication of the symbol selected to be output on the channel associated with the element for the at least one further port, and X is the vector indicator of the at least one control symbol and the at least one channel for the at least one port.

The channel set may comprise an allocated set of channels.

Determining the at least one further control symbol and at least one further channel may comprise: determining the allocated set of channels is an odd number of channels; and selecting a further allocated channel when the allocated set of channels is an odd number of channels, wherein the channel set further comprises the further allocated channel.

The channel and the further channel may comprise at least one of: frequency resources; time period resources; and code resources.

The method may further comprise: receiving the at least one control symbol and at least one channel from a channel set for the at least one control symbol representing at least one control signal at a first antenna port; and receiving the at least one further control symbol and at least one further channel from the channel set for the at least one further control symbol at least one further antenna port, wherein the at least one further control symbol and the at least one further channel is dependent on the at least one control symbol and the at least one channel.

According to a second aspect of the invention there is provided an apparatus comprising at least one processor and at least one memory including computer program code the at least one memory and the computer program code configured to, with the at least one processor, cause the apparatus at least to perform: determining at least one control symbol and at least one channel from a channel set for at least one control symbol representing the at least one control signal for at least one port; and determining at least one further control symbol and at least one further channel from the channel set for the at least one further control symbol for at least one further port, wherein the at least one further control symbol and the at least one further channel is dependent on the at least one control symbol and the at least one channel.

The apparatus may further be caused to perform: transmitting the at least one control symbol over the at least one channel from a first antenna port; and transmitting the at least one further control symbol over the at least one further channel from a second antenna port.

The apparatus caused to perform determining at least one further control symbol and at least one further channel may be further caused to perform: receiving an indicator of the at least one control symbol and the at least one channel; and mapping the indicator to determine the at least one further control symbol and at least one further channel for the at last one further control symbol.

The apparatus caused to perform the determining at least one further control symbol and at least one further channel may be further caused to perform: pairing the channel set into pairs of channels; and mapping comprises determining a further control symbol for the indicator indicating that the at least one channel is the first channel of a channel set pairing by complex conjugating the at least one control symbol for the second channel of the channel set pair, and a further control symbol for the indicator indicating that the at least one channel is the second channel of the channel set pair is the product of −1 and a complex conjugation of the at least one control symbol for the first channel of the channel set pair.

The indicator may comprise a vector comprising a first number of elements, wherein the first number of elements is the number of available channels, and wherein each element represents an indication of the symbol selected to be output on the channel associated with the element.

The apparatus caused to perform the mapping the indicator may be further caused to perform the mathematical function: $Y(i)=(-1)^{i+1} \operatorname{conj}[X(2\lfloor i/2 \rfloor+(i+1 \bmod 2))]$, where Y is an indicator for the at least one further control symbol and at least one further channel comprising a second vector comprising the first number of second vector elements, and wherein each of the second vector elements represents an indication of the symbol selected to be output on the channel associated with the element for the at least one further port, and X is the vector indicator of the at least one control symbol and the at least one channel for the at least one port.

The channel set comprises an allocated set of channels.

The apparatus caused to perform determining the at least one further control symbol and at least one further channel may be further caused to perform: determining the allocated set of channels is an odd number of channels; and selecting a further allocated channel when the allocated set of channels is an odd number of channels, wherein the channel set further comprises the further allocated channel.

The apparatus may be further caused to perform: receiving the at least one control symbol and at least one channel from a channel set for the at least one control symbol representing at least one control signal at a first antenna port; and receiving the at least one further control symbol and at least one further channel from the channel set for the at least one further control symbol at least one further antenna port, wherein the at least one further control symbol and the at least one further channel is dependent on the at least one control symbol and the at least one channel.

The channel and the further channel may comprise at least one of: frequency resources; time period resources; and code resources.

According to a third aspect of the invention there is provided an apparatus comprising: a first control channel generator configured to determine at least one control symbol and at least one channel from a channel set for at least one control symbol representing the at least one control signal for at least one port; and a second control channel generator configured to determine at least one further control symbol and at least one further channel from the channel set for the at least one further control symbol for at least one further port, wherein the at least one further control symbol and the at least one further channel is dependent on the determined at least one control symbol and the at least one channel.

The apparatus may further comprise: a first antenna port configured to receive and transmit the at least one control symbol over the at least one channel; and a second antenna port configured to receive and transmit the at least one further control symbol over the at least one further channel from a second antenna port.

The second control channel generator may comprise: an input configured to receive an indicator of the at least one control symbol and the at least one channel; and a mapper configured to map the indicator to determine the at least one further control symbol and at least one further channel for the at last one further control symbol.

The second control channel generator may comprise a channel pairer configured to pair the channel set into pairs of channels.

The second control channel generator may comprise a channel pair selector configured to select a pair of channels dependent on the output of the first control channel generator output.

The second control channel generator mapper may comprise a first symbol generator configured to determine a further control symbol for the indicator indicating that the at least one channel is the first channel of a channel set pairing by complex conjugating the at least one control symbol for the second channel of the channel set pair, and a second symbol generator configured to determine a further control symbol for the indicator indicating that the at least one channel is the second channel of the channel set pair by generating the product of −1 and a complex conjugation of the at least one control symbol for the first channel of the channel set pair.

The indicator may comprise a vector comprising a first number of elements, wherein the first number of elements is the number of available channels, and wherein each element represents an indication of the symbol selected to be output on the channel associated with the element.

The mapper may comprise a processor configured to perform a mathematical function: $Y(i)=(-1)^{i+1} \text{conj}[X(2\lfloor i/2 \rfloor + (i+1 \mod 2))]$, where Y is an indicator for the at least one further control symbol and at least one further channel comprising a second vector comprising the first number of second vector elements, and wherein each of the second vector elements represents an indication of the symbol selected to be output on the channel associated with the element for the at least one further port, and X is the vector indicator of the at least one control symbol and the at least one channel for the at least one port.

The channel set may comprise an allocated set of channels.

The second control channel generator may comprise: a channel number determiner configured to determine the allocated set of channels is an odd number of channels; and an additional channel allocator configured to a further allocated channel when the allocated set of channels is an odd number of channels, wherein the channel set further comprises the further allocated channel.

The channel and the further channel may comprise at least one of: frequency resources; time period resources; and code resources.

The apparatus may further comprise: a first antenna port configured to receive the at least one control symbol and at least one channel from a channel set for the at least one control symbol representing at least one control signal; and a second antenna port configured to receive the at least one further control symbol and at least one further channel from the channel set for the at least one further control symbol at least one further antenna port, wherein the at least one further control symbol and the at least one further channel is dependent on the at least one control symbol and the at least one channel According to a fourth aspect of the invention there is provided an apparatus comprising: a first control channel generator means configured to determine at least one control symbol and at least one channel from a channel set for the at least one control symbol representing at least one control signal for at least one port; and a second control channel generator means configured to determine at least one further control symbol and at least one further channel from the channel set for the at least one further control symbol for at least one further port, wherein the at least one further control symbol and the at least one further channel is dependent on the determined at least one control symbol and the at least one channel.

According to a fifth aspect of the invention there is provided a computer-readable medium encoded with instructions that, when executed by a computer perform: determining at least one control symbol and at least one channel from a channel set for the at least one control symbol representing the at least one control signal for at least one port; determining at least one further control symbol and at least one further channel from the channel set for the at least one further control symbol for at least one further port, wherein the at least one further control symbol and the at least one further channel is dependent on the at least one control symbol and the at least one channel.

An electronic device may comprise apparatus as described above.

A chipset may comprise apparatus as described above.

An integrated circuit or chip set may comprise an apparatus as described above.

A user equipment may comprise an apparatus as described above.

A base station may comprise an apparatus as described above.

Various embodiments of the present invention will now described by way of example only with reference to the accompanying Figures, in which:—

Embodiments of the present invention are described herein by way of particular examples and specifically with reference to preferred embodiments. It will be understood by one skilled in the art that the invention may not be limited to the details of the specific embodiments given herein. Furthermore although in the specification as follows may refer to "an", "one", or "some" embodiments in several places, this should not be interpreted that each reference is to the same embodiment or that the feature only applies to a single embodiment.

Figure 1:
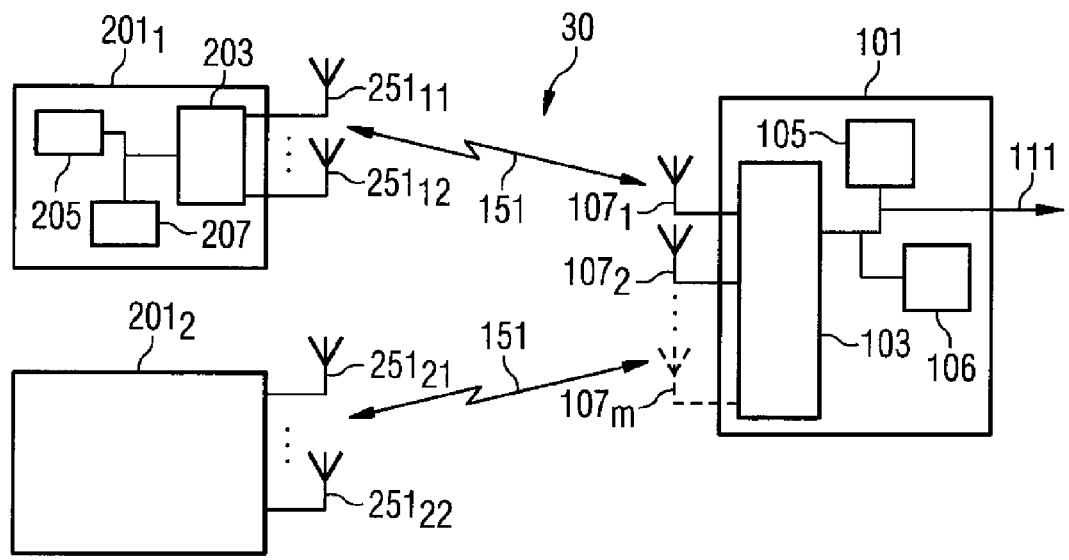
FIG. 1 shows a schematic view of a system including an schematic base station and user equipment configuration within which embodiments of the invention may be implemented.

FIG. 1 shows a communication network 30 in which some embodiments of the present invention may be implemented. In particular, some embodiments of the present invention may relate to the implementation of radio modulators/demodulators (modems) for a range of devices that may include: user equipment 201, relays, access points or base stations 101 which communicate over a wireless environment 151.

Embodiments of the present invention may be applicable to communication networks implemented according to a range of standards and their evolution including: WCDMA (Wideband Code Division Multiple Access), 3GPP LTE (Long Term Evolution), WiMax (Worldwide Interoperability for Microwave Access), UMB (Ultra Mobile Broadband), CDMA (Code Division Multiple Access), 1×EV-DO (Evolution-Data Optimized), WLAN (Wireless Local Area Network), and UWB (Ultra-Wide Band) receivers.

With respect to FIG. 1, a schematic view of a system within which embodiments of the invention may be implemented is shown. The communication system 30 is shown with a base station 101 which may be a node B (NB), an enhanced node B (eNB) or any access server suitable for enabling user equipment 201 to access wirelessly a communication system.

FIG. 1 shows a system whereby the base station (BS) 101 may transmit to the user equipment (UE) 201 via the wireless environment communications channel 151, which may be known as the downlink (DL), and the user equipment (UE) 201 may transmit to the base station (BS) 101 via the wireless environment communications channel 151, which may be known as the uplink (UL).

The base station 101 can in some embodiments comprise a processor 105 which may be configured to control the operation of the receiver/transmitter circuitry 103. The processor can in some embodiments be configured to run software stored in memory 106.

The memory 106 can in some embodiments be further configured to store data and/or information to be transmitted and/or received. The memory 106 in such embodiments can further be used to store configuration parameters used by the processor 105 in operating the base station 101.

The transmitter/receiver circuitry 103 in some embodiments can be configured to operate as a configurable transmitter and/or receiver converting between radio frequency signals of a specific protocol for transmission over (or reception via) the wireless environment and baseband digital signals. The transmitter/receiver circuitry 103 in some embodiments can be configured to use the memory 106 as a buffer for data and/or information to be transmitted over or received from the wireless environment 151.

The transmitter/receiver circuitry 103 can be in some embodiments further configured to be connected to at least one antenna for receiving and transmitting the radio frequency signals over the wireless environment to the user equipment 201. In FIG. 1 the base station is shown comprising 2 antennas, the first antenna $107_1$ and the second antenna $107_2$ both configured to transmit and receive signals. In other embodiments of the invention the base station may have more antennas represented by the dotted antenna $107_m$ in FIG. 1. In some embodiments, m may be 4.

The base station 101 in some embodiments is connected to other network elements via a communications link 111. The communications link 111 in such embodiments receives data to be transmitted to the user equipment 201 via a network connection downlink and transmits data received from the user equipment 201 via a network connection uplink. This data in some embodiments comprises data for all of the user equipment within the cell or wireless communications range operated by the base station 101. The communications link 111 is shown in FIG. 1 as a wired link. However it would be understood that the communications link may further be a wireless communications link. Furthermore in some embodiments the base station 101 communications link 111 can be implemented using a wireless communications link similar to that employed by an user equipment communicating to a base station as described in further detail hereafter. In such embodiments the base station 101 can be configured to operate as a relay node or enhanced relay node operating between user equipment and further base station equipment. It would be further understood that although the following description largely focuses on the preparation and generation of control signals that the base station is configured to receive and decode the base stations knowing which channels are being used by which antenna.

In FIG. 1, there is shown two user equipment 201 within the range of the base station 101. However it would be understood that there may be more or fewer user equipment 201 within range of the base station 101. The user equipment may be a mobile station, or any other apparatus or electronic device suitable for communication with the base station. For example in some further embodiments of the invention the user equipment may be personal data organisers, or portable computers suitable for wireless communication in the environment as described hereafter. It should be appreciated that embodiments of the invention can also be applied to a relay station.

FIG. 1 in particular shows a first user equipment $UE_1$ $201_1$ and a second user equipment $UE_2$ $201_2$. Furthermore FIG. 1 shows in more detail the first user equipment $UE_1$ $201_1$. The first user equipment $201_1$ can in some embodiments comprise a processor 205 configured to control the operation of a receiver/transmitter circuitry 203. The processor 205 in some embodiments can be configured to run software stored in memory 207. The processor may further control and operate any operation required to be carried out by the user equipment such as operation of the user equipment display, audio and/or video encoding and decoding in order to reduce spectrum usage, etc.

The memory 207 can in some embodiments be further configured to store data and/or information to be transmitted and/or received. The memory 207 can in such embodiments further be used to store configuration parameters used by the processor 205 in operating the user equipment $201_1$. The memory in both the user equipment and in the base station can in some embodiments be solid state memory (such as for example flash memory, random access memory, read only memory), optical memory (such as, for example, CD or DVD format data discs), magnetic memory (such as floppy or hard drives), or any media suitable for storing the programs for operating the processors, configuration data or transmission/reception data.

The transmitter/receiver circuitry 203 in some embodiments can be configured to operate as a configurable transmitter and/or receiver converting between radio frequency signals of a specific protocol for transmission over (or reception via) the wireless environment and baseband digital signals. The transmitter/receiver circuitry 203 therefore in some embodiments can be configured to use the memory 207 as a buffer for data to be transmitted over or received from the wireless environment 151.

The transmitter/receiver circuitry 203 is configured to be connected to at least two antennas for receiving and transmitting the radio frequency signals over the wireless environment to the base station 101. In FIG. 1 the user equipment is shown comprising 2 antennas, the first antenna $251_{11}$ and the second antenna $251_{12}$. However it would be appreciated that in some embodiments there may be more than two antennas or antenna ports for each user equipment. Furthermore, in some other embodiments there may be more than two antennas virtualized into two antenna ports for one or more use equipment.

Although FIG. 1 and the examples described hereafter describe the user equipment and the base station as having a processor arranged to carry out the operations described below, it would be understood that in embodiments of the invention the respective processors may comprise a single processor or a plurality of processors. The processors furthermore in some embodiments can be implemented by one or more integrated circuits.

Some embodiments of the present invention can be used in the LTE-Advanced system which may be part of 3GPP LTE Rel. 10. However, it should be appreciated that this is by way of example only and embodiments of the invention may be used in alternative systems.

Figure 2:
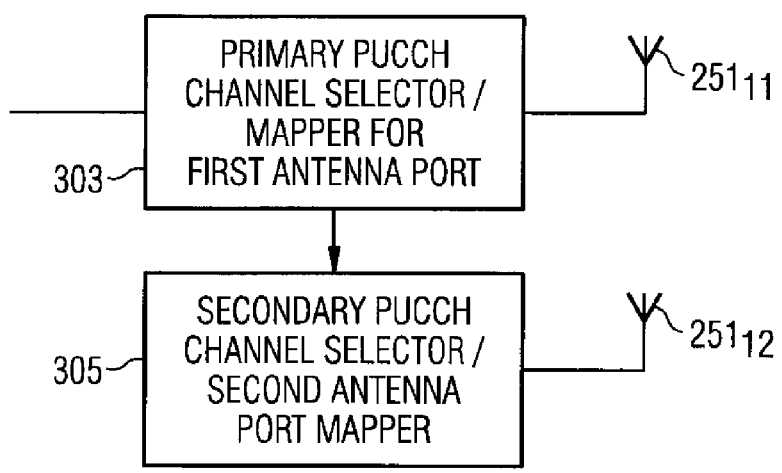
FIG. 2 shows a schematic view of a uplink channel selector according to some embodiments of the application.

With respect to FIG. 2 the processor 205 with respect to some embodiments of the application is described in further detail, and specifically the PUCCH channel selector apparatus and PUCCH symbol generation apparatus is shown in further detail. With respect to FIG. 3 the operation of the processor and specifically the PUCCH channel selector apparatus and PUCCH symbol generation apparatus according to some embodiments of the application are furthermore described in further detail.

The processor 205 is thus in some embodiments configured to provide PUCCH channel selection for multiple antenna transmission without significantly increasing the number of PUCCH channels required to be reserved. In such embodiments of the application summarised firstly a selection of the PUCCH channel for the first antenna port based on the information content can be performed. This as describe can in some embodiments be similar to the single antenna port channel selection process, for example the channel selection process described in standard 3GPP TS 36.213 V8.8.0 or any other suitable channel selection process. Secondly a second PUCCH channel can be selected for the second antenna port which is linked to the channel index used for the first antenna port by a predetermined rule. In some embodiments another part of the predetermined rule can be the definition of the second antenna port signal e.g. from the first antenna port signal. For example the predetermined rule can be in some embodiments applying a space coding to the first antenna port signal and mapping the coded signal to the second antenna port.

In such embodiments where a single or odd number of channels are selected in a single antenna port user equipment an additional PUCCH channel is allocated or reserved. Thus in these embodiments there is always an even number of PUCCH channels available for channel selection with single-user multiple-input multiple-output (SU-MIMO) user equipment.

Group can be used. In these embodiments the selection of the PUCCH channel as well as the modulated symbol transmitted via the selected channel for the first antenna port may be selected based on information content.

In such embodiments there are M PUCCH format channels available subject to channel selection in the primary PUCCH channel selector 303. Based on the information content corresponding to multiple separate information elements (each having two or three different states, ACK/NACK and DTX) the UE can select one out of M PUCCH format 1/1a/1b channels for transmission; and transmit one QPSK-modulated PUCCH format 1b sequence via the selected PUCCH Format 1/1a/1b channel. Part of the information goes via channel selection, another part goes via sequence modulation.

For example where there are four assigned PUCCH channels {CE#0, CE#1, CE#2 and CE#3} the primary PUCCH channel selector 303 can on mapping 4-bit control data bits [b0, b1, b2, b3] generate one of four QPSK symbols {S0, S1, S2, S3} and output one of the symbols on one of the first antenna port channels as shown by the antenna port #1 column in the table below:

| Data Bits | | | | Antenna Port #1 | | | | Antenna Port #2 | | | |
|---|---|---|---|---|---|---|---|---|---|---|---|
| b0 | b1 | b2 | b3 | CE#0 | CE#1 | CE#2 | CE#3 | CE#0 | CE#1 | CE#2 | CE#3 |
| 0 | 0 | 0 | 0 | s0 | 0 | 0 | 0 | 0 | s0* | 0 | 0 |
| 0 | 0 | 0 | 1 | s1 | 0 | 0 | 0 | 0 | s1* | 0 | 0 |
| 0 | 0 | 1 | 0 | s2 | 0 | 0 | 0 | 0 | s2* | 0 | 0 |
| 0 | 0 | 1 | 1 | s3 | 0 | 0 | 0 | 0 | s3* | 0 | 0 |
| 0 | 1 | 0 | 0 | 0 | s0 | 0 | 0 | −s0* | 0 | 0 | 0 |
| 0 | 1 | 0 | 1 | 0 | s1 | 0 | 0 | −s1* | 0 | 0 | 0 |
| 0 | 1 | 1 | 0 | 0 | s2 | 0 | 0 | −s2* | 0 | 0 | 0 |
| 0 | 1 | 1 | 1 | 0 | s3 | 0 | 0 | −s3* | 0 | 0 | 0 |
| 1 | 0 | 0 | 0 | 0 | 0 | s0 | 0 | 0 | 0 | 0 | s0* |
| 1 | 0 | 0 | 1 | 0 | 0 | s1 | 0 | 0 | 0 | 0 | s1* |
| 1 | 0 | 1 | 0 | 0 | 0 | s2 | 0 | 0 | 0 | 0 | s2* |
| 1 | 0 | 1 | 1 | 0 | 0 | s3 | 0 | 0 | 0 | 0 | s3* |
| 1 | 1 | 0 | 0 | 0 | 0 | 0 | s0 | 0 | 0 | −s0* | 0 |
| 1 | 1 | 0 | 1 | 0 | 0 | 0 | s1 | 0 | 0 | −s1* | 0 |
| 1 | 1 | 1 | 0 | 0 | 0 | 0 | s2 | 0 | 0 | −s2* | 0 |
| 1 | 1 | 1 | 1 | 0 | 0 | 0 | s3 | 0 | 0 | −s3* | 0 |

For example as shown in FIG. 2 the processor 205 comprises a primary PUCCH channel selector 303. The primary PUCCH channel selector 303 in some embodiments can also be defined as or called the first antenna mapper. The primary PUCCH channel selector 303 is configured to receive the control data bits and channel indicators (such as the channel reservation information) and generate for the first antenna port a symbol to be output on the first or primary antenna $251_{11}$.

In some embodiments the primary PUCCH channel selector 303 generates the symbol first before selecting a channel.

Figure 3:
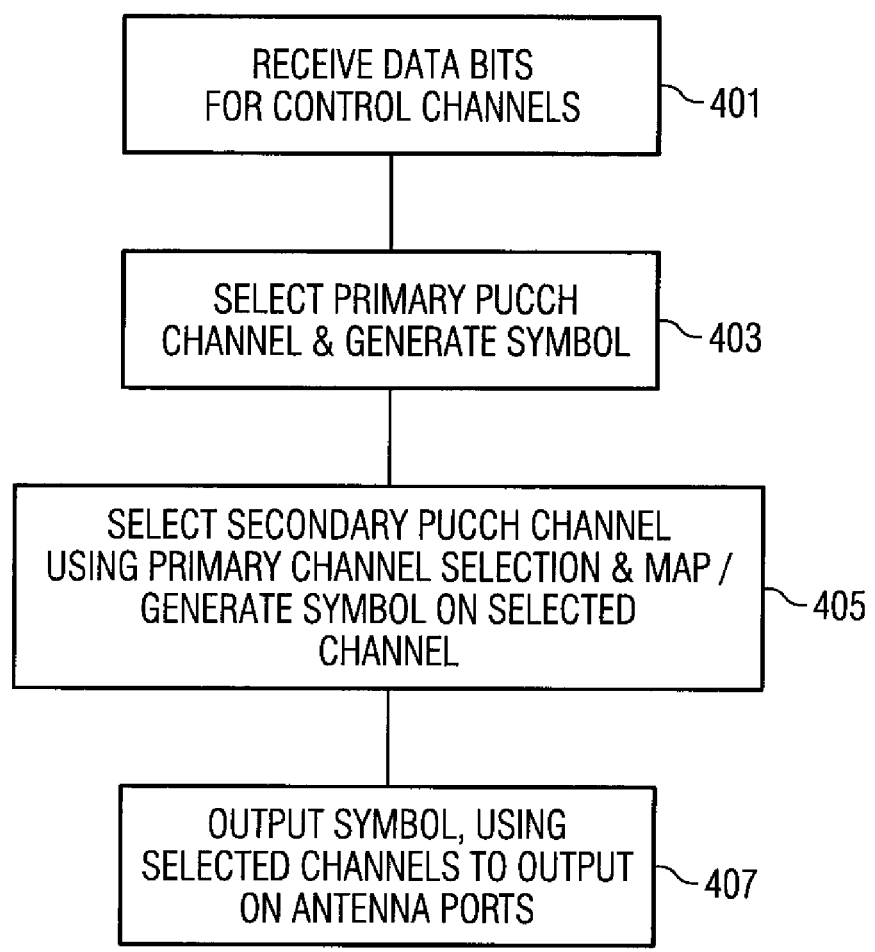
FIG. 3 shows a flowchart of operations of the uplink channel selector according to some embodiments of the application.

The operation of receiving the data bits for control channels is shown in FIG. 3 by step 401.

The operation of generating a symbol and selecting a PUCCH channel can be performed using any suitable PUCCH channel selection operation. For example as described previously any suitable single transmitter antenna PUCCH selection and symbol generation criteria can be used. For example in some embodiments the PUCCH format 1/1a/1b channel selection can be used. Furthermore in these or some other embodiments the PUCCH format 1b channel selection criteria such as described in 3GPP TS36.213 V8.8.0 (2009-09) standard as published by the 3GPP Standards The operation of selecting the first antenna port channel and selecting the modulation symbol is shown in FIG. 3 by step 403.

The processor 205 can in some embodiments further comprise a secondary PUCCH channel selector 305, which in some embodiments can also be described or defined as the second antenna port mapper. The secondary PUCCH channel selector 305 receives the output from the primary PUCCH channel selector 303 indicating which symbol and on which channel the symbol is to be output and generates a second PUCCH channel selection such that the secondary PUCCH channel selector outputs on the sec- and antenna port the same data but encoded in a separate way as to not to interfere with the primary or first antenna port output but to provide some spatial diversity assistance in transmitting the signal. In particular, in these embodiments the second antenna port signal is encoded in a way that the data transmission can be easily separated from a data transmission where first antenna port signal would be transmitted on the PUCCH channel used now by the second antenna port signal.

In some embodiments the secondary PUCCH channel selector 305 comprises a look-up table which on receiving the primary PUCCH channel selection output generates its own secondary PUCCH channel selector output to be output to the second antenna port $251_{12}$. As can be seen in the table above, for the example 4 channel, 4 control bit encoding the space coding for the second antenna port signal is determined in order to make the detection of such a signal feasible at the receiver.

In some embodiments the secondary PUCCH channel selector 305 is configured to pair PUCCH channels from the available or allocated PUCCH channel set which was used by the primary PUCCH channel selector 303. In such embodiments the secondary PUCCH channel selector 305 can thus comprise a channel pairer to perform a pairing operation. As is described later in some embodiments the channel pairer can be configured to determine that where an odd number of channels were used as the channel set in the primary PUCCH channel selector 303 that an additional channel is used to complete the remainder channel pairing. In such embodiments the secondary PUCCH channel selector 305 and/or channel pairer can arbitrarily pairing the channels providing that the result of the pairing operation is that each allocated PUCCH channel is part of only one pair.

Furthermore in some embodiments the secondary PUCCH channel selector 305 is further configured to select one pair of PUCCH paired channels. In some embodiments the secondary PUCCH channel selector comprises a pair selector configured to receive the pairing information and the result of the primary PUCCH channel selection and select the paired PUCCH channels based on the channel selected by the primary PUCCH channel selector 303.

In these embodiments the secondary PUCCH channel selector 305 is further configured to produce a second antenna port signal corresponding to the first antenna port signal mapped on the first paired PUCCH channel. The secondary PUCCH channel selector can in these embodiments thus comprise a channel mapper configured to generate a symbol/signal which is a complex conjugate of the first antenna port signal output from the primary PUCCH channel selector 303 and which is mapped on the second of the paired PUCCH channels. Furthermore in such embodiments the channel mapper can be configured to further generate a second antenna port signal corresponding to an complex conjugate the first antenna port signal mapped on the second of the paired PUCCH channel further multiplied by −1 and mapped on the first of the paired PUCCH channels.

Thus in some embodiments the secondary PUCCH channel selector 305 applies a mapping function to generate for a second antenna port function Y from the received first antenna port function X. X and Y are size-4 vectors containing modulation symbols on antenna ports 1 and 2 respectively for all the PUCCH channels. Thus X(0) is the output on the CE#0 channel, X(1) the output on the CE#1 channel, X(2) the output on the CE#2 channel, and X(3) the output on the CE#3 generated by the primary PUCCH channel selector 303. The Y vector in this example can be expressed as:

$$Y=[-conj(X(1))conj(X(0))-conj(X(3))conj(X(2))]$$

where conj(X(n)) is the complex conjugate of X(n).

In some embodiments where there are more than 4 channels the secondary PUCCH selector 305 operation can be further generalized for any even number of PUCCH channels as $$Y(i)=(-1)^{i+1}conj[X(2\lfloor i/2 \rfloor+(i+1 \bmod 2))]$$

where i is PUCCH channel index 0, 1, 2, 3, . . . .

The operation of selecting the secondary PUCCH channel and selecting the modulation symbol using the primary channel selection and modulation symbol information is shown in FIG. 3 by step 405.

Although in the above example 4-bit control information, QPSK modulation symbols and two antenna ports are used it would be appreciated that more or fewer bits can be implemented in some embodiments, other types of modulation can be implemented, and more than two antenna ports could be used. Specifically in some embodiments further antenna mappers could configured to receive channel selection data and channel allocation data to determine further channel selections from the allocated channel set dependent on the previous channel selections. Furthermore although the example given above is defined by the generalised Y equation also shown above other mappings can be implemented from determined antenna port channel selections to generate channel selections for further antenna ports.

The outputting of the symbols using the selector channels to output on the antenna port is shown in FIG. 3 by step 407.

As have be found by the inventors, the benefits of search system is that the user equipment equipped with multiple transmit antennas can where an even number of resources are allocated be operated using the same amount of PUCCH resources/channels as a single antenna user equipment but producing spatial gains. In some embodiments where an odd number of bits are used or required to be encoded, or an odd number of resources are allocated the multiple transmit antenna method as described above can be implemented by using only a single additional PUCCH channel resource.

In such embodiments where an odd number of PUCCH channels are required or determined to be required or allocated in the primary PUCCH channel selection criteria operated by the primary PUCCH channel selector 303, the primary PUCCH channel selector allocates or is allocated an even number of channels even if not all of the channels are required.

This is for example useful in typical time division duplex (TDD) operations where the number of PUCCH channels available may be dynamically varied according to the enhanced node B scheduling decisions.

In some embodiments the user equipment is configured to signal the use of an additional PUCCH channel explicitly.

In some other embodiments the user equipment is configured to derive the additional channel implicitly based on a predetermined linkage to the first control channel element of a corresponding physical downlink control channel.

The example shown in the following table illustrates the sub-frame (or component carrier)-specific resource usage where the number of resource assignments received (DL grants) is between 1 and 4 in a 4 channel/resource/sub-frame example and is applicable to both explicit and implicit resource allocation of the additional PUCCH resource.

| # of grants received | M = 4 | | | | Additional resource |
|---|---|---|---|---|---|
| 1 | | x | | x | x |
| 2 | | x | x | | |
| 3 | x | x | x | | x |
| 4 | x | x | x | x | |
| | sub-frame/ CC | sub-frame/ CC | sub-frame/ CC | sub-frame/ CC | |

The table thus shows four time division duplex sub-frames. Where the number of grants received are an even number (in other words an even number of PUCCH channels are available for channel selection), no additional resource is used by the second antenna port however where there is an odd number of resources granted, additional resources are used by the second antenna port. These additional resources can be either signalled or derived implicitly as indicated above.

In such embodiments (as compared to the situations where an additional resource is always used for the second antenna) the PUCCH channel selection gain is now available to both antennas. The explicit signalling of the additional resource can be made in some embodiments via higher layers (e.g. as part of RRC signalling). Signalling can thus in these embodiments be configured by the eNB. In some embodiments the implicit signalling is based on the use of predetermined rules. In such embodiments both the UE and the eNB are aware of the rule and derive the channel index for the additional resource based on the pre-defined rule.

These embodiments thus show a significant advantage over the SORTD PUCCH channel selection which require twice the number of resources in even number of resource allocation examples. Furthermore even when generally compared to SORTD PUCCH channel selection embodiments of the application practical examples require only between 50% to 67% of PUCCH resources.

Furthermore when compared to space cyclic shift block coding selection the number of PUCCH channels is not restricted to two and furthermore the PUCCH channels do not need to be allocated within a single physical resource block. This produces significant benefits over the previously known operations.

Furthermore there is an additional benefit in that the primary PUCCH channel selector 303 may be implemented using existing channel selection criteria such as Rel'8 3GPP PUCCH channel selection specification and implementations. In other words operations related to the first antenna port can be the same as currently used and thus optimised according to known optimal situations and operations relating to the sec- and antenna port only required to be added when used.

Embodiments of the invention may be used with fewer antennas than four or more than four antennas.

It would be appreciated that the channels described above used in the first and second channel selections can be defined by any suitable orthogonal resource, for example frequency resources, time period resources; and code resources.

It is noted that whilst embodiments may have been described in relation to user equipment or mobile devices such as mobile terminals, embodiments of the present invention may be applicable to any other suitable type of apparatus suitable for communication via access systems. A mobile device may be configured to enable use of different access technologies, for example, based on an appropriate multi-radio implementation.

It is also noted that although certain embodiments may have been described above by way of example with reference to the exemplifying architectures of certain mobile networks and a wireless local area network, embodiments may be applied to any other suitable forms of communication systems than those illustrated and described herein. It is also noted that the term access system may be understood to refer to any access system configured for enabling wireless communication for user accessing applications.

The above described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility may be to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the inventions may be practiced in various components such as integrated circuit modules. The design of integrated circuits can be by and large a highly automated process. Complex and powerful software tools may be available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. may automatically route conductors and locate components on a semiconductor chip using well established rules of design as well as libraries of pre-stored design modules. Once the design for a semiconductor circuit may have been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following: (a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
    determining at least one control symbol and at least one channel from a channel set for the at least one control symbol representing at least one control signal for at least one port; and
    determining at least one further control symbol and at least one further channel from the channel set for the at least one further control symbol for at least one further port, wherein determining at least one further control symbol and at least one further channel comprises:
    receiving an indicator of the at least one channel; and
    mapping the indicator to determine the at least one further channel for the at least one further control symbol,
    wherein the indicator comprises a vector having a first number of elements, the first number of elements being the number of associated channels, each element representing an indication of the symbol selected to be output on the channel associated with the element, and
    wherein mapping the indicator comprises applying a mathematical function to said first number of elements to obtain an identical number of elements for a second vector for the at least one further control symbol and the at least one further channel.

2. The method as claimed in claim 1 further comprising:
    transmitting the at least one control symbol over the at least one channel from a first antenna port; and
    transmitting the at least one further control symbol over the at least one further channel from a second antenna port.

3. The method as claimed in claim 1, wherein the determining at least one further control symbol and at least one further channel comprises:
    pairing the channel set into pairs of channels; and
    mapping comprises determining a further control symbol for the first channel of a channel set pairing by complex conjugating the at least one control symbol for the indicator indicating that the at least one channel is the second channel of the channel set pair, and a further control symbol for the second channel of the channel set pair is the product of −1 and a complex conjugation of the at least one control symbol for the indicator indicating that the at least one channel is the first channel of the channel set pair.

4. The method as claimed in claim 1, wherein the mathematical function is:

$$Y(i)=(-1)^{i+1}\mathrm{conj}[X(2\lfloor i/2 \rfloor+(i+1 \bmod 2))],$$

where Y is the indicator for the at least one further control symbol and the at least one further channel comprising the second vector having the first number of second vector elements, and wherein each of the second vector elements represents an indication of the symbol selected to be output on the channel associated with the element for the at least one further port, and X is the vector indicator of the at least one control symbol and the at least one channel for the at least one port.

5. The method as claimed in claim 1, wherein the channel set comprises an allocated set of channels.

6. The method as claimed in claim 5, wherein determining the at least one further control symbol and at least one further channel comprises:
    determining the allocated set of channels is an odd number of channels;
    selecting a further allocated channel when the allocated set of channels is an odd number of channels, wherein the channel set further comprises the further allocated channel.

7. The method as claimed in claim 1, wherein the channel and the further channel comprises at least one of:
    frequency resources;
    time period resources; and
    code resources.

8. The method as claimed in claim 1, further comprising:
    receiving the at least one control symbol and at least one channel from a channel set for the at least one control symbol representing at least one control signal at a first antenna port; and
    receiving the at least one further control symbol and at least one further channel from the channel set for the at least one further control symbol at at least one further antenna port, wherein the at least one further control symbol and the at least one further channel is dependent on the at least one control symbol and the at least one channel.

9. An apparatus comprising at least one processor and at least one memory including computer program code, the at least one memory and the computer program code configured, with the at least one processor, to cause the apparatus at least to perform:
    determining at least one control symbol and at least one channel from a channel set for the at least one control symbol representing at least one control signal for at least one port; and
    determining at least one further control symbol and at least one further channel from the channel set for the at least one further control symbol for at least one further port, wherein the at least one processor and the at least one memory are further configured, with the at least one processor, to cause the apparatus to perform determining at least one further control symbol and at least one further channel by:
    receiving an indicator of the at least one channel; and
    mapping the indicator to determine the at least one further channel for the at least one further control symbol,
    wherein the indicator comprises a vector having a first number of elements, the first number of elements being the number of associated channels, each element representing an indication of the symbol selected to be output on the channel associated with the element, and
    wherein mapping the indicator comprises applying a mathematical function to said first number of elements to obtain an identical number of elements for a second vector for the at least one further control symbol and the at least one further channel.

10. The apparatus as claimed in claim 9, wherein the at least one processor and the at least one memory are further configured, with the at least one processor, to cause the apparatus to perform:
    transmitting the at least one control symbol over the at least one channel from a first antenna port; and
    transmitting the at least one further control symbol over the at least one further channel from a second antenna port.

11. The apparatus as claimed in claim 9, wherein the at least one processor and the at least one memory are further configured, with the at least one processor, to cause the apparatus to perform:
    pairing the channel set into pairs of channels; and
    mapping comprises determining a further control symbol for the first channel of a channel set pairing by complex conjugating the at least one control symbol the indicator indicating that the at least one channel is for the second channel of the channel set pair, and a further control symbol for the second channel of the channel set pair is the product of −1 and a complex conjugation of the at least one control symbol the indicator indicating that the at least one channel is for the first channel of the channel set pair.

12. The apparatus as claimed in claim 9, wherein the mathematical function is:

$$Y(i)=(-1)^{i+1}\text{conj}[X(2\lfloor i/2 \rfloor+(i+1 \bmod 2))],$$

where Y is the indicator for the at least one further control symbol and the at least one further channel comprising the second vector having the first number of second vector elements, and wherein each of the second vector elements represents an indication of the symbol selected to be output on the channel associated with the element for the at least one further port, and X is the vector indicator of the at least one control symbol and the at least one channel for the at least one port.

13. The apparatus as claimed in claim 9, wherein the channel set comprises an allocated set of channels.

14. The apparatus as claimed in claim 13, wherein the at least one processor and the at least one memory are further configured, with the at least one processor, to cause the apparatus to perform:

determining the allocated set of channels is an odd number of channels; and selecting a further allocated channel when the allocated set of channels is an odd number of channels, wherein the channel set further comprises the further allocated channel.

15. The apparatus as claimed in claim 9, wherein channel and the further channel comprises at least one of:
frequency resources;
time period resources; and
code resources.

16. The apparatus as claimed in claim 9, wherein the at least one processor and the at least one memory are further configured, with the at least one processor, to cause the apparatus to perform:

receiving the at least one control symbol and at least one channel from a channel set for the at least one control symbol representing at least one control signal at a first antenna port; and receiving the at least one further control symbol and at least one further channel from the channel set for the at least one further control symbol at at least one further antenna port, wherein the at least one further control symbol and the at least one further channel is dependent on the at least one control symbol and the at least one channel.

* * * * *